United States Patent
Hansen

(10) Patent No.: US 10,072,636 B2
(45) Date of Patent: Sep. 11, 2018

(54) WIND TURBINE BLADE HAVING A CONDUCTIVE ROOT BUSHING

(71) Applicant: LM WP Patent Holding A/S, Kolding (DK)

(72) Inventor: Lars Bo Hansen, Agerskov (DK)

(73) Assignee: LM WP PATENT HOLDING A/S, Kolding (DK)

( * ) Notice: Subject to any disclaimer, the term of this patent is extended or adjusted under 35 U.S.C. 154(b) by 785 days.

(21) Appl. No.: 14/359,687

(22) PCT Filed: Nov. 14, 2012

(86) PCT No.: PCT/EP2012/072572
§ 371 (c)(1),
(2) Date: May 21, 2014

(87) PCT Pub. No.: WO2013/075990
PCT Pub. Date: May 30, 2013

(65) Prior Publication Data
US 2014/0271190 A1    Sep. 18, 2014

(30) Foreign Application Priority Data
Nov. 23, 2011 (EP) .................................. 11190298

(51) Int. Cl.
*F03D 80/30* (2016.01)
*F03D 80/00* (2016.01)

(52) U.S. Cl.
CPC .............. *F03D 80/30* (2016.05); *F03D 80/00* (2016.05); *Y02E 10/72* (2013.01); *Y02E 10/721* (2013.01); *Y02E 10/722* (2013.01)

(58) Field of Classification Search
CPC ....... F03D 80/30; F03D 80/00; Y02E 10/722; Y02E 10/721
USPC .......................... 416/146 R, 39, 229 R, 230
See application file for complete search history.

(56) References Cited

U.S. PATENT DOCUMENTS

| | | | |
|---|---|---|---|
| 2007/0009361 A1* | 1/2007 | Moller Larsen ....... | H02G 13/00 416/146 R |
| 2008/0206059 A1* | 8/2008 | Hancock ............... | F03D 1/0658 416/213 R |
| 2009/0196751 A1* | 8/2009 | Jacobsen ............... | F03D 1/0675 416/146 R |
| 2011/0142643 A1* | 6/2011 | Hardison .................. | F03D 1/00 416/146 R |

(Continued)

FOREIGN PATENT DOCUMENTS

| | | |
|---|---|---|
| DE | 102005051537 A1 | 5/2007 |
| DE | 102008045939 A1 | 3/2010 |

(Continued)

*Primary Examiner* — Kevin Murphy
*Assistant Examiner* — Kelsey Cary
(74) *Attorney, Agent, or Firm* — Nath, Goldberg & Meyer; Jerald L. Meyer; Tanya E. Harkins

(57) ABSTRACT

A wind turbine blade is described having a lightning protection system wherein a lightning down conductor is conductively coupled to at least one blade root bushing provided at the root end of the blade. The use of the blade root bushing as part of the conductive path of the lightning protection system allows for a structurally sound and reliable connection of an internal down conductor to an external lightning protection system and/or to a suitable ground connection at the blade root end.

11 Claims, 5 Drawing Sheets

(56) References Cited

U.S. PATENT DOCUMENTS

2013/0177428 A1\* 7/2013 Zeller .................. F03D 1/0658
416/219 A

FOREIGN PATENT DOCUMENTS

| DE | 202010013535 U1 | 12/2010 |
|----|-----------------|---------|
| EP | 1561030 A1 | 8/2005 |
| WO | 0079128 A1 | 12/2000 |
| WO | 2006070171 A1 | 7/2006 |

\* cited by examiner

WIND TURBINE BLADE HAVING A CONDUCTIVE ROOT BUSHING

This is a National Phase Application filed under 35 U.S.C. 371 as a national stage of PCT/EP2012/072572, filed Nov. 14, 2012, and claims priority benefit from European Application No. 11190298.7, filed Nov. 23, 2011, the content of each of which is hereby incorporated by reference in its entirety.

FIELD OF THE INVENTION

The present invention relates to a wind turbine blade having a lightning down conductor system.

BACKGROUND OF THE INVENTION

A lightning protection system (also known as LPS) is an important design feature for modern wind turbines, due to the relative height and exposure of the wind turbine structures. In general, an LPS consists of a lightning receptor provided on a wind turbine blade, which is used to receive a lightning strike. Once hit by lightning, the receptor conducts the lightning to a ground connection via a lightning down conductor provided within the blade.

As most current wind turbine designs involve pitchable blades, or blades having relatively complicated mounting arrangements at the blade root, one of the primary issues with known LPS examples is how to conduct the lightning strike from the down conductor around the root end of the blade and to a ground connection provided at the wind turbine nacelle or hub.

An example of a known LPS system can be seen in European Patent No. EP 1 561 030, which shows what can be described as a spark gap solution. In EP 1 561 030, the lightning down conductor is passed through the external wall of the blade from the blade interior, to a conductive strip or plate provided on the external surface of the blade. A head element is provided at the exterior of the blade, closely aligned with the conductive strip, the head element coupled to a ground connection provided in the greater wind turbine structure. The system presents a spark gap between the conductive strip and the head element, irrespective of the current blade pitch angle. This ensures that a conductive path is always presented from lightning receptors in the blade through the spark gap solution to the subsequent ground connection in the wind turbine structure, bypassing the root end connection of the blade and the associated pitch system and bearings.

One issue with the spark gap solution as described above is that, as the lightning down conductor must pass through the wall of the blade body, this generally requires the drilling or cutting of a suitable hole in the wall of the blade. Such a post moulding operation can impact on the structural stability of the blade, introducing weaknesses in the vicinity of the hole, which may require additional strengthening. Furthermore, such an operation can requires additional effort in assembly, as the down conductor must passed through the hole, as well as subsequent sealing of the hole.

DE 20 2010 013535 describes an alternate lightning protection system connection method, but which does not address the problem of integration with existing LPS solutions.

It is an object of the invention to provide a wind turbine blade having a Lightning Protection System with an alternative conduction path which provides for improved performance and ease of manufacture.

SUMMARY OF THE INVENTION

Accordingly, there is provided a blade for a wind turbine, the blade having a tip end and a root end, the blade comprising:
 at least one lightning receptor conductively coupled to a lightning down conductor provided in the blade; and
 a plurality of root bushings provided at said root end,
 wherein said down conductor is conductively coupled to at least one of said root bushings to provide a conductive path to ground for said down conductor.

The root bushings of the blade are located in an area of high structural strength, to withstand the large forces of the blade root moments. Accordingly, by utilising the bushings as a conductive path for the lightning down conductor, it is possible to provide a conductive path through the blade body without impacting on the structural integrity of the blade itself. It will be understood that the lightning receptor may be part of any suitable lightning protection system for a wind turbine blade. Preferably, the lightning down conductor is an internal down conductor, provided within the blade body.

Preferably, the at least one root bushing is formed from a conductive material.

Preferably, the wind turbine blade for a rotor is provided for a wind turbine having a substantially horizontal rotor shaft, the rotor comprising a hub, from which the wind turbine blade extends substantially in a radial direction when mounted to the hub, the wind turbine blade extending in a longitudinal direction parallel to a longitudinal axis and having a tip end and a root end,
 the wind turbine blade comprising a profiled contour including a pressure side and a suction side, as well as a leading edge and a trailing edge with a chord having a chord length extending therebetween, the profiled contour, when being impacted by an incident airflow, generating a lift.

Preferably, said blade comprises a shell body defining an internal chamber, wherein an internal aperture is defined in an internal surface of said shell body at the root end of the blade, the internal aperture extending from said internal chamber to said bushing, and
 wherein said lightning down conductor is coupled through said internal aperture to said bushing.

A minor post-moulding operation may still be required to connect the down conductor to the bushing. However, as the internal aperture does not extend through the entire shell body, rather just to the bushing, this means that a shorter, shallower aperture can be used, having less structural implications and reduced post-moulding requirements.

Preferably, said blade further comprises an inner conductive bushing connection element provided in said internal aperture, said inner connection element extending from said internal chamber to said root bushing, said inner conductive bushing connection element providing a lightning down conductor attachment point in said internal chamber for coupling to said lightning down conductor.

By using a separate conductive bushing connection element which provides an attachment point for the down conductor, the lightning conduction system of the blade can be relatively easily assembled, as the down conductor does not have to be passed through the internal aperture. The down conductor can be easily connected to and removed from the conductive bushing connection element to provide for ease of assembly as well as facilitating maintenance and repair operations.

Additionally or alternatively, the conductive bushing connection element may be formed integrally with the root bushing, and/or the conductive bushing connection element may be fixedly connected to the root bushing, for example by welding, soldering, bolting, etc. Such a system may help to retain the bushing within the blade body by preventing the bushing from being pulled out of the root.

Preferably, a root end of said lightning down conductor is bolted to said conductive bushing connection element, wherein said conductive bushing connection element comprises an aperture to receive a bolt. Preferably, said bolt is formed from a conductive material.

A bolt-based connection provides a simple attachment and conductive connection between the lightning down conductor and the bushing (through the conductive bushing connection element), which can be easily installed and removed if desired.

In one embodiment, said blade further comprises an external conductive element provided on an external surface of said shell body at said root end, wherein said external conductive element is conductively coupled with said down conductor through said at least one of said bushings to provide a conductive path to ground for said down conductor.

Where the lightning is conducted through the blade body to an outer conduction system, e.g. a spark gap solution, the bushing can be used as a short cut through the shell body for the conductive path of the lightning down conductor. It will be understood that in such a system, at least a portion of current arising from a lightning strike on the blade will be conducted via the internal lightning down conductor to the root end, where the current is conducted through the blade shell body via the bushing, to an external connection for subsequent conduction to ground. Such a solution allows for the lightning current to avoid the blade root connection and/or the blade pitch system, preventing damage to such components.

In one embodiment, it will be understood that the conductive bushing may be conductively coupled to a further element, e.g. a blade root flange, which may provide a further path to ground for a lightning strike. The provision of such an alternate path allows for a lightning strike in the blade to be divided between separate paths to ground, resulting in reduced current in each path.

Preferably, said external conductive element comprises a conductive contact plate for a spark gap system.

Preferably, an external aperture is defined in said external surface of said shell body at the root end of the blade, said external aperture extending from said external surface chamber to said bushing, and wherein said external conductive element is coupled through said external aperture to said bushing.

The use of this system means that only two relatively shallow apertures are required, as opposed to one single through-going aperture, which may require additional reinforcement, sealing, and/or initial working.

Additionally or alternatively, the blade further comprises an outer conductive bushing connection element provided in said external aperture, said outer connection element extending from the external surface of the shell body to said root bushing, said outer conductive bushing connection element providing an attachment point for said external conductive element.

Again, the use of a separate outer conductive bushing connection element allows for the ease of assembly of the blade components, as it provides a simple connection point for the external conductor, e.g. a conductive plate for a spark gap solution. Preferably, the outer conductive bushing connection element comprises an aperture to receive a bolt, such that the external conductor may be bolted to the outer conductive bushing connection element.

Preferably, at least one notch is defined on said at least one root bushing, said at least one notch operable to couple with a projection defined on said inner conductive bushing connection element and/or said outer conductive bushing connection element.

The notched construction of the bushing ensures that the conductive bushing connection element(s) will be securely aligned with the root bushing, and will ensure that a solid connection is made between the bushing and the elements. It also provides for an improved assembly procedure, as a worker will be easily able to see if a solid connection has been made between the element and the bushing, due to the effective insertion of the projection defined on the element (s) into the notch provided on the bushing.

Additionally or alternatively, said blade is adapted to be coupled with a blade pitch system at the root end of said blade, wherein said at least one bushing is adapted to be conductively coupled to said blade pitch system to provide a conductive path to ground for said down conductor through said blade pitch system.

As the bushing is secured against the pitch system, accordingly, the pitch system may be used to conduct at least a portion of the lightning to ground. This may be preferable in systems having a pitch system of relatively large dimensions. This may be provided as the primary conductive path to ground, or as an additional path in combination with an external solution, e.g. a spark gap solution. Additionally or alternatively, the blade may be mounted to a wind turbine hub or nacelle using a bolting flange, wherein a conductive path to ground may be provided through said bolting flange.

Additionally or alternatively, said down conductor may be conductively coupled to a plurality of said root bushings, preferably through a plurality of internal apertures defined in said shell body.

In some cases, it may be desirable to connect the down conductor to several separate bushings, to distribute the high power levels caused by a lightning strike through several different bushing elements.

Preferably, said down conductor is conductively coupled to a plurality of root bushings, wherein the selected plurality of root bushings are substantially evenly distributed about the root end of the blade.

As the root bushings that the down conductor is connected to are spaced about the root end circumference, the lightning charge is evenly distributed throughout the root end of the blade. Preferably, said selected bushings are evenly spaced from one another.

In one embodiment, said shell body is formed from a first blade half substantially forming a pressure side of a wind turbine blade and a second blade half substantially forming a suction side of a wind turbine blade, said first and second blade halves defining said internal chamber therebetween, the blade further comprising at least one blade web extending between an internal surface of said first blade half and an internal surface of said second blade half, wherein said lightning down conductor is carried on said blade web between said at least one lightning receptor and said blade root.

Locating the lightning conductor on the blade web provides a good mounting point for the conductor, and can ensure that the conductor will be spaced from the shell body, to reduce the risk of the conductor attracting a lightning strike itself.

Preferably, said shell body comprises a composite fibre body.

Preferably, said plurality of root bushings are formed from steel. It will be understood that any suitable conductive material may be used.

There is also provided a wind turbine having at least one wind turbine blade as described above.

Preferably, the wind turbine comprises a ground connection, wherein the lightning down conductor of said at least one wind turbine blade is conductively coupled to said ground connection through the at least one root bushing of said at least one wind turbine blade, for example through the at least one root bushing to an external conductive element and/or to a pitch system or bolting flange.

DESCRIPTION OF THE INVENTION

An embodiment of the invention will now be described, by way of example only, with reference to the accompanying drawings, in which.

Common elements between the different embodiments will be referred to using the same reference numerals.

Figure 1:
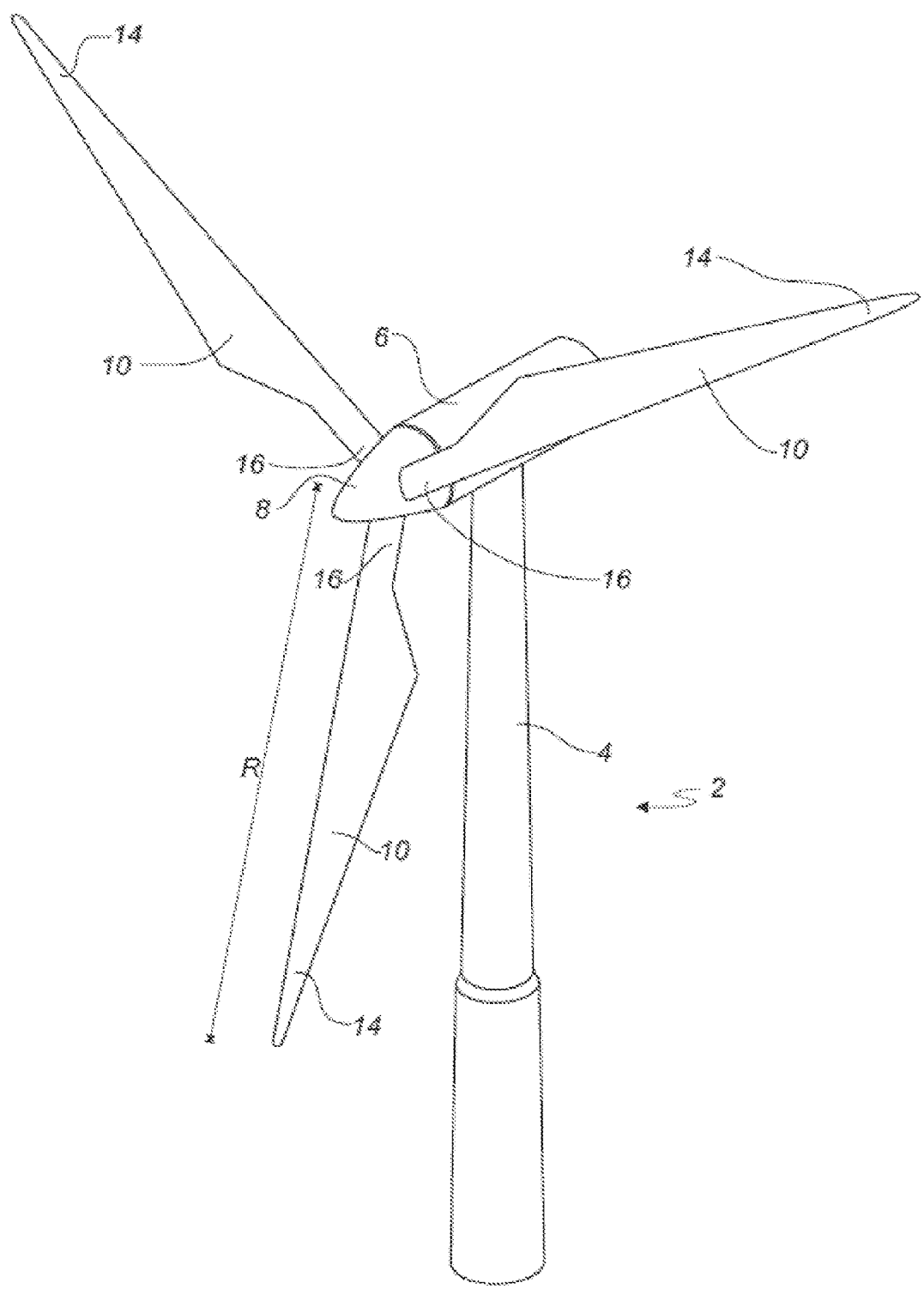
FIG. 1 shows a wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root end 16 nearest the hub and a blade tip end 14 furthest from the hub 8. The rotor has a radius denoted R.

Figure 2:
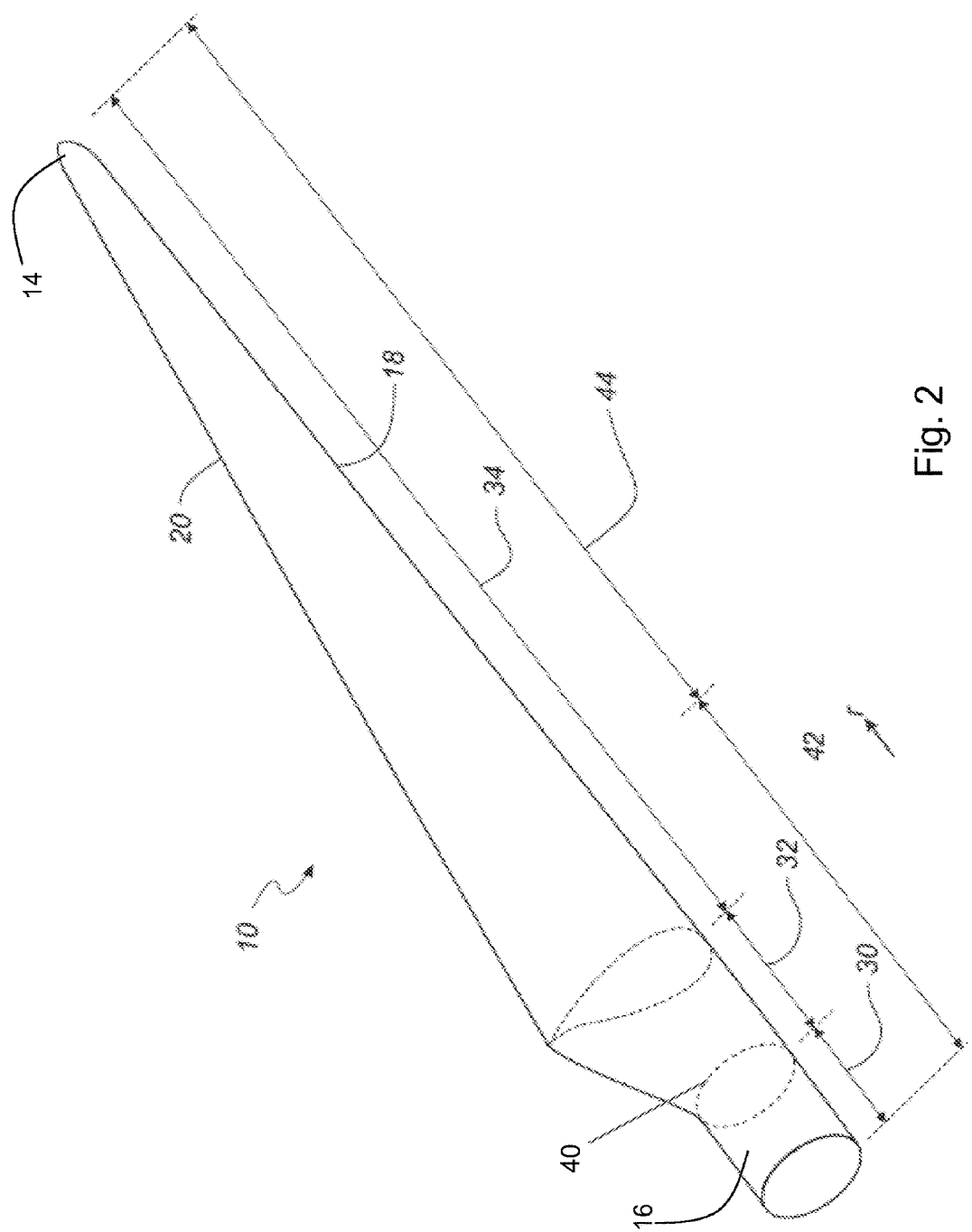
FIG. 2 shows a schematic view of a wind turbine blade according to the invention.

FIG. 2 shows a schematic view of a first embodiment of a wind turbine blade 10 according to an embodiment of the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile 42 gradually changing from the circular or elliptical shape 40 of the root region 30 to the airfoil profile 44, 50 of the airfoil region 34. The chord length of the transition region 32 typically increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

Figure 3:
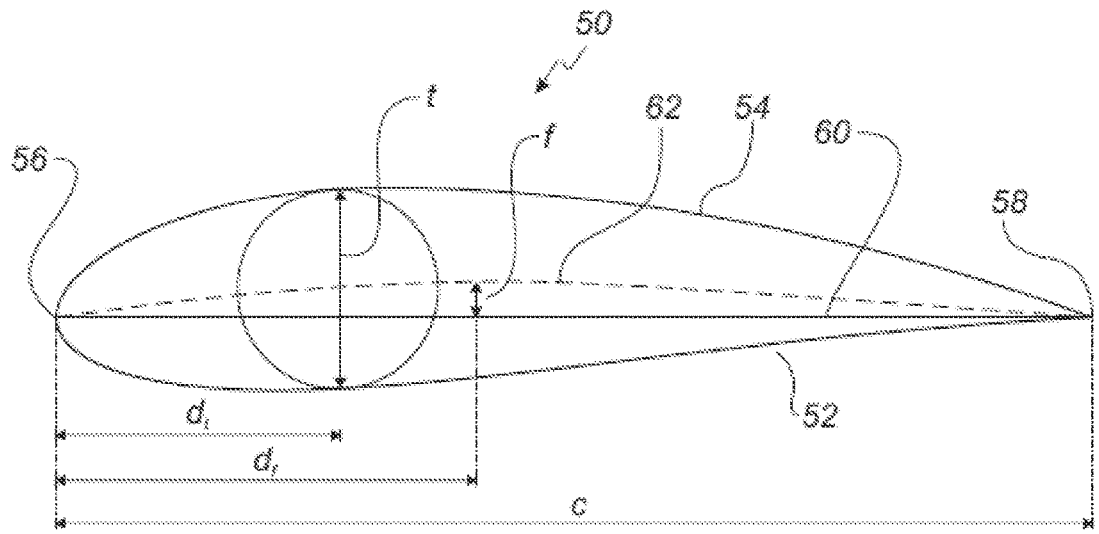
FIG. 3 shows a schematic view of an airfoil profile of the blade of FIG. 2.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber and lower camber, which are defined as the distances from the chord 60 and the suction side 54 and pressure side 52, respectively.

Airfoil profiles are often characterised by the following parameters: the chord length c, the maximum camber f, the position df of the maximum camber f, the maximum airfoil thickness t, which is the largest diameter of the inscribed circles along the median camber line 62, the position dt of the maximum thickness t, and a nose radius (not shown). These parameters are typically defined as ratios to the chord length c.

Figure 4:
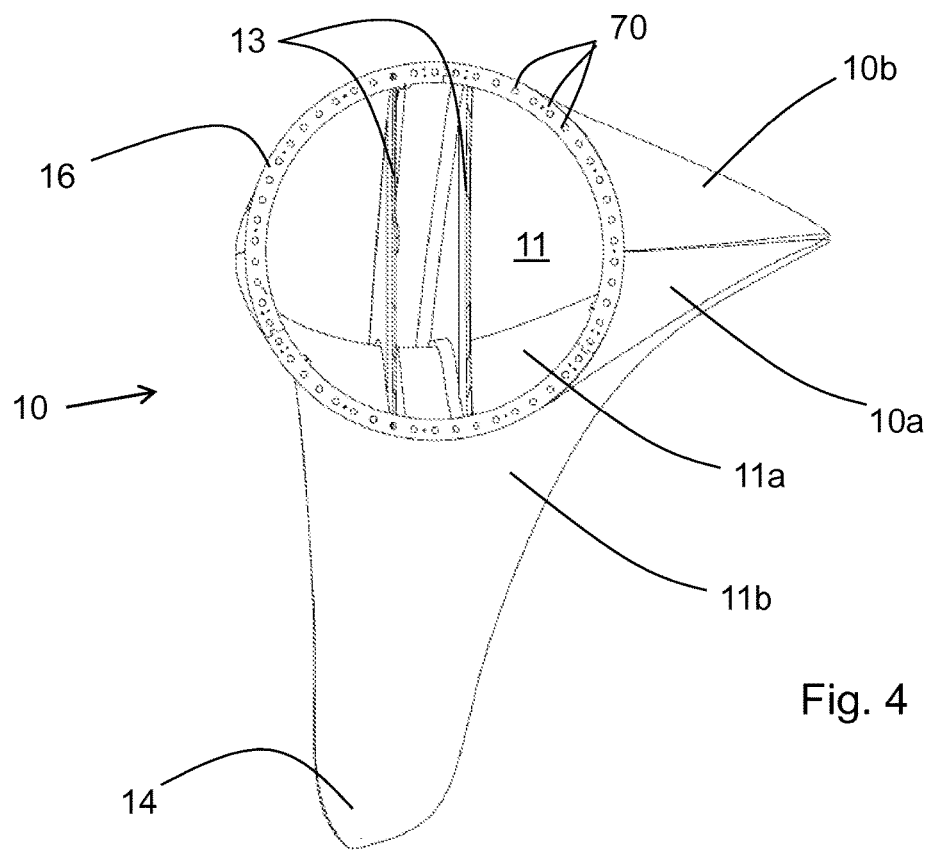
FIG. 4 shows a plan view of the root end of a wind turbine blade according to the invention.

With reference to FIG. 4, an example of a swept rotor blade 10 is shown, seen from the root end 16 of the blade looking towards the tip end 14 of the blade. The root end 16 is substantially circular in shape, and has a plurality of apertures 70 defined about the circumference of the root end 16, to receive bolts to allow the blade 10 to be mounted to a wind turbine hub 8 (and/or a rotor blade pitch system).

As can be seen from FIG. 4, the blade 10 is formed from two blade shell halves 10a and 10b, a first blade half 10a substantially forming a pressure side of the blade 10, a second blade half substantially forming a suction side of the blade 10. The blade halves 10a, 10b are joined together to form a blade shell body defining an internal chamber 11, wherein the blade body has an internal blade surface 11a and an external blade surface 11b. A pair of internal blade webs 13 are located within the internal chamber 11, and extend between said first and second blade halves 10a, 10b. The function of the webs 13 is primarily to provide structural rigidity to the blade shell body.

Figure 5:
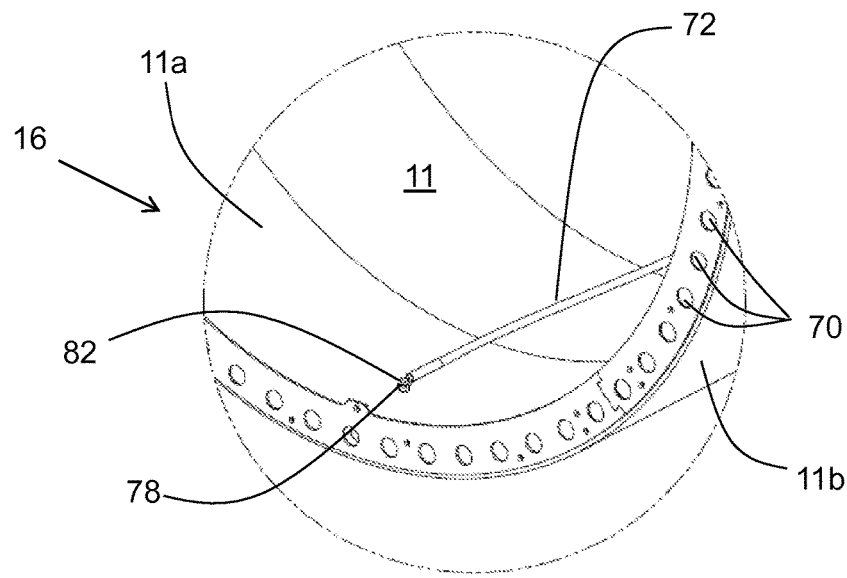
FIG. 5 shows an enlarged perspective view of a lightning down conductor at the root end of a wind turbine blade according to the invention.

A lightning receptor (not shown) is provided at the tip end 14 of the blade 10. With reference to FIG. 5, the lightning receptor is conductively connected to a lightning down conductor 72, which extends along the length of the blade 10 towards the root end 16 of the blade 10. It will be understood that the blade 10 may comprise a plurality of additional lightning receptors provided along the body of the blade 10, wherein the lightning down conductor 72 is conductively coupled to each of the separate receptors. Preferably, the down conductor 72 is carried on one of the internal webs 13, to provide a secure mount for the conductor 72 and ensure that it is spaced from the walls of the internal chamber 11.

With reference to FIGS. 5 and 6, at the root end 16 of the blade 10 a plurality of blade root bushings 74 are positioned around the circumference of the blade root 16, the apertures 70 defined in said bushings 74 to receive mounting bolts (not shown) to mount the wind turbine blade 10 to the wind turbine structure. The blade 10 may be directly mounted to a wind turbine hub 8, and/or may be mounted to a blade pitch system (not shown) which allows the blade 10 to be pitched relative to the oncoming airflow at the blade 10.

The root bushings 74 are securely mounted in the root end 16 of the blade 10, the root end 16 and bushings 74 being configured to withstand the considerable forces present due to blade root moments at the root end 16 of the blade 10. The bushings 74 are formed from a conductive material, e.g. steel.

Figure 6A:
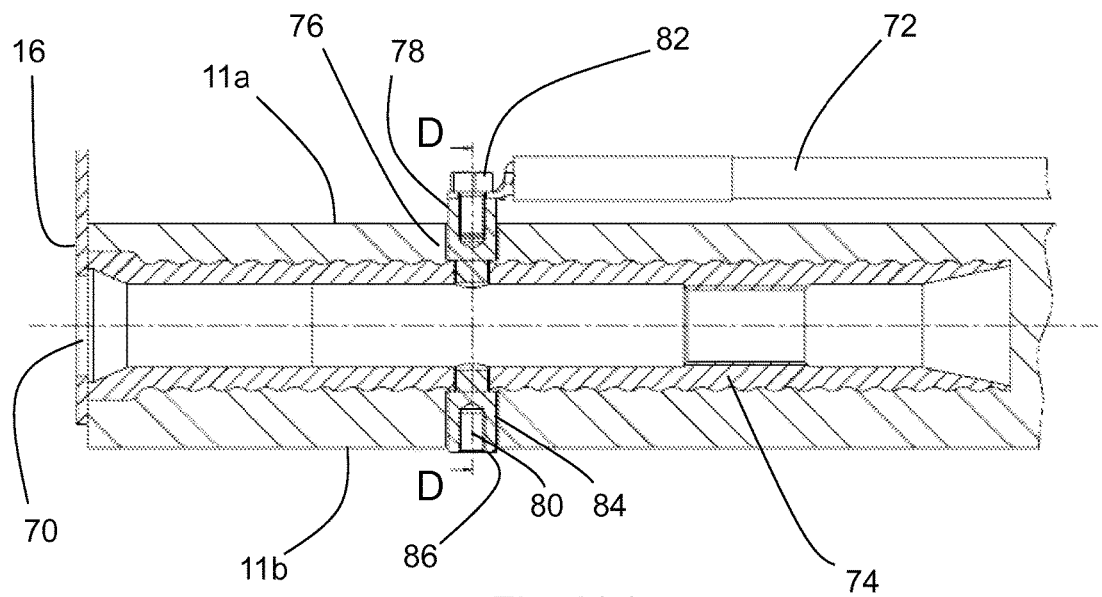
FIG. 6(a) shows a cross-sectional view along the length of a blade root bushing connected to a lightning down conductor according to an embodiment of the invention.

With reference to FIG. 6(a), a cross-section of one of the blade root bushings 74 is shown extending from an aperture 70 provided at the surface of the blade root end 16. To take advantage of the high structural stability of the bushings 74, the lightning down conductor 72 is arranged such that it is conductively coupled with at least one of the bushings 74, the bushings 74 providing a conductive path to ground for the down conductor 72.

As can be seen in FIG. 6(a), an internal aperture 76 is provided in the blade body, extending from the internal blade surface 11a to the surface of the root bushing 74. An inner conductive bushing connection element 78 is located at least partially within the aperture 76. With reference to FIG. 7, the conductive bushing connection element 78 comprises a body 78a having a bolt hole 80 defined therein. Returning to FIG. 6, a root end of the lightning down conductor 72 is bolted to the inner conductive bushing connection element 78 using a bolt 82 received within the bolt hole 80 of the inner element 78. The conductive bushing connection element 78 is formed from a conductive material, such that a conductive path is formed from the lightning down conductor 72 through the inner conductive bushing connection element 78 to the surface of the blade root bushing 74.

In the embodiment shown in FIG. 6, an external aperture 84 is formed in the blade body, the external aperture 84 extending from the external blade surface 11b to the surface of the root bushing 74. An outer conductive bushing connection element 86 is located at least partially within the external aperture 84. The outer conductive bushing connection element 86 is adapted for connection to an external portion of a lightning protection system, for example a spark gap solution (not shown). In such a case, with additional reference to FIG. 7, the outer conductive bushing connection element 86 is operable to receive a bolt (not shown) within a bolt hole 80 provided in the element 86, such that a conductive member, e.g. a conductive plate for a spark gap system, may be bolted to the outer element 86.

It will be understood that, with reference to FIG. 7, while in the illustrated embodiment the outer conductive bushing connection element 86 is substantially similar to the inner conductive bushing connection element 78, any suitable construction of bushing connection element may be used.

In such a manner, a conductive path can be provided from the lightning down conductor 72, through the inner conductive bushing connection element 78, via the blade root bushing 74, through the outer conductive bushing connection element 86, to a suitable lightning protection element conductively coupled to ground. Accordingly, a lightning strike may be conducted down along a lightning down conductor 72 and through the walls of the blade body, avoiding the blade root connections and/or any associated blade pitch system. As relatively shallower apertures 76, 84 are used compared to the through-going apertures of the prior art, this system results in lesser impact on the structural integrity of the walls of the blade body.

Additionally or alternatively, the blade root bushing 74 may be operable to provide a conductive path to metal flanges provided at the root end 16 of the blade, and/or to a connected blade pitch system, where the pitch system is of a sufficient size to withstand a lightning strike without significant damage inflicted on the contained pitch bearings. It will be understood that such a conductive path may be selected as the primary or sole conductive path for the lighting protection system of the blade 10.

The use of separate inner and outer conductive bushing connection elements provides for separate attachment points for the lightning down conductor 72 and/or external lightning protection system elements. Accordingly, the blade can be relatively easily assembled, as the down conductor 72 does not have to be passed through the internal aperture. Furthermore, the down conductor 72 can be easily connected to and removed from the inner conductive bushing connection element 78 to provide for ease of facilitating maintenance and repair operations.

It will be understood however that the lightning down conductor 72 may be directly connected to the root bushing 74 through said internal aperture 76.

Figure 6B:
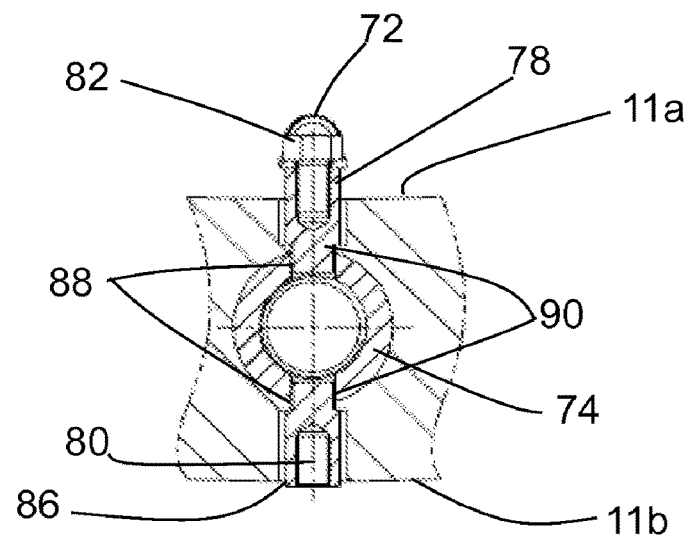
FIG. 6(b) shows a cross-sectional view along the line D-D of FIG. 6(a)
Figure 7:
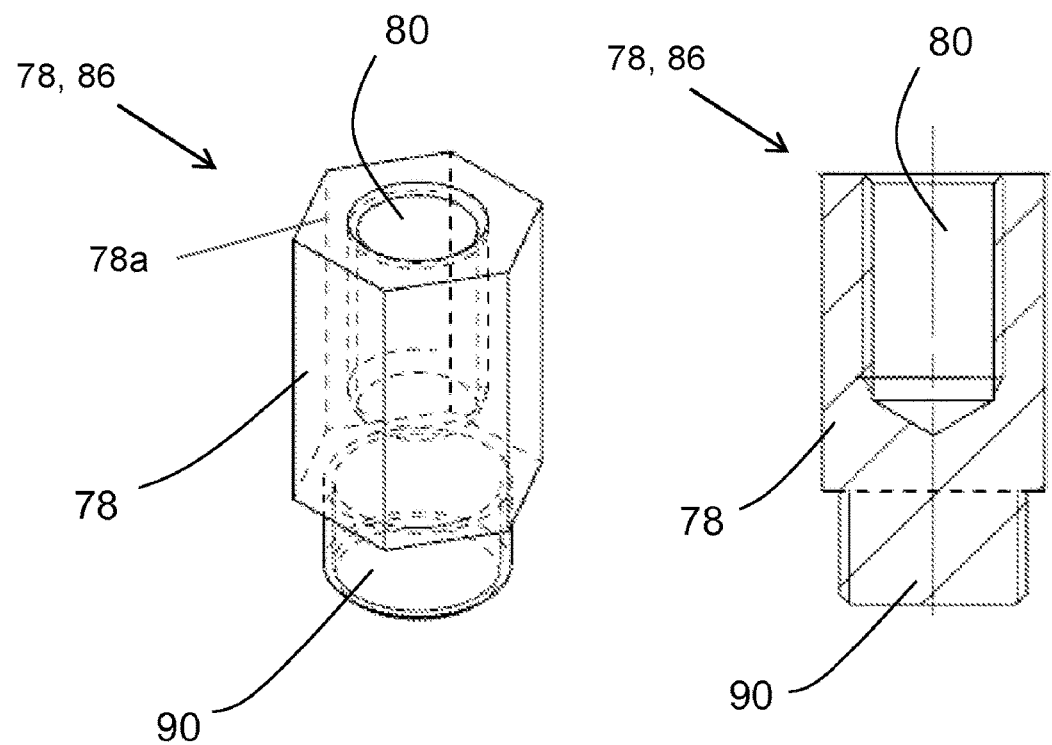
FIG. 7 shows perspective and cross-sectional views of a conductive bushing connection element according to an embodiment of the invention.

With reference to FIGS. 6(a), 6(b) and 7, in a preferred embodiment of the invention, at least a first notch 88 or channel is provided in the surface of the blade root bushing 74. A projection 90 provided on said inner conductive bushing connection element 78 is dimensioned to couple with said notch 88, such that the inner conductive bushing connection element 78 is securely coupled with the root bushing 74 when the inner conductive bushing connection element 78 is positioned within the internal aperture 76.

The coupling interaction between the projection 90 and the notch 88 ensures that a satisfactory conductive connection is formed between the inner conductive bushing connection element 78 and the root bushing 74. Furthermore, as the projection 90 of the inner conductive bushing connection element 78 will slot into the notch 88, this provides a relatively simple and reliable method to ensure that the inner conductive bushing connection element 78 is securely received and coupled to the root bushing 74, as a worker may be able to visually inspect if an inner conductive bushing connection element 78 has been fully inserted into the internal aperture 76 and the associated notch 88. A similar notch-and-projection coupling is also provided for the outer conductive bushing connection element 78 and the root bushing 74.

As can be seen from FIG. 7, the conductive bushing connection elements 78,86 comprise a body 78*a* having a hexagonal cross-section, but it will be understood that any suitable body shape may be used. Furthermore, it will be understood that bolt hole 80 defined in the body 78*a* may be configured to couple with any suitable attachment means.

While the embodiment shown illustrate the lightning down conductor 72 coupled to a single blade root bushing 74, it will be understood that the down conductor 72 may be coupled to a plurality of bushings, and wherein said plurality of bushings may be evenly spaced about the blade root end circumference. This may be done to more evenly distribute the conductive path presented at the blade root end through a greater number of conductive components.

The use of such a configuration of blade lightning protection system and lightning down converter provides for a reliable path to ground for any lightning strikes on the blade, while not significantly impacting on the structural integrity of the blade itself. It also provides for a relatively easier manufacture and maintenance procedure for the lightning protection system in the blade.

The invention is not limited to the embodiment described herein, and may be modified or adapted without departing from the scope of the present invention.

The invention claimed is:

1. A blade for a wind turbine, the blade having a tip end and a root end, the blade comprising:
   at least one lightning receptor conductively coupled to a lightning down conductor provided in the blade;
   a plurality of root bushings provided at said root end;
   a shell body having an internal aperture extending between an internal blade surface and a surface of at least one of the root bushings, the shell body further having an external aperture extending between an external blade surface and the surface of the at least one of the root bushings;
   an inner conductive bushing connection element located at least partially within the internal aperture, the inner conductive bushing connection element being in electrical communication with the lightning down conductor and the surface of the at least one of the root bushings; and
   an outer conductive bushing connection element located at least partially within the external aperture, wherein said outer conductive bushing element is in electrical communication with the surface of the at least one of the root bushings to provide a conductive path to ground for said lightning down conductor.

2. The blade of claim 1, wherein the external aperture is located at the root end of the blade.

3. The blade of claim 1, wherein at least one notch is defined on the at least one of the root bushings, said at least one notch operable to couple with a projection defined on said outer conductive bushing connection element.

4. The blade of claim 1, wherein said shell body defines an internal chamber, and wherein the internal aperture is located at the root end of the blade.

5. The blade of claim 4, wherein a root end of said lightning down conductor is bolted to said inner conductive bushing connection element, wherein said inner conductive bushing connection element comprises an aperture to receive a bolt.

6. The blade of claim 4, wherein at least one notch is defined on the at least one of the root bushings, said at least one notch operable to couple with a projection defined on the inner conductive bushing connection element.

7. The blade of claim 1, wherein the plurality of said root bushings are substantially evenly distributed about the root end of the blade.

8. The blade of claim 1, wherein said shell body is formed from a first blade half substantially forming a pressure side of a wind turbine blade and a second blade half substantially forming a suction side of a wind turbine blade, said first and second blade halves defining an internal chamber therebetween, the blade further comprising at least one blade web extending between an internal surface of said first blade half and an internal surface of said second blade half, wherein said lightning down conductor is carried on said blade web between said at least one lightning receptor and said blade root.

9. The blade of claim 1, wherein the at least one of the root bushings is conductively coupled to a blade root flange, said blade root flange providing a connection point for a lightning protection system ground connection.

10. A wind turbine having at least one wind turbine blade as claimed in claim 1.

11. The blade for a wind turbine as recited in claim 1, wherein the internal aperture and the external aperture are diametrically opposed with respect to one another.

* * * * *